No. 675,302. Patented May 28, 1901.
W. L. SKEEL.
AUTOMATIC FEEDER FOR THRESHING MACHINES.
(Application filed June 7, 1900.)
(No Model.)
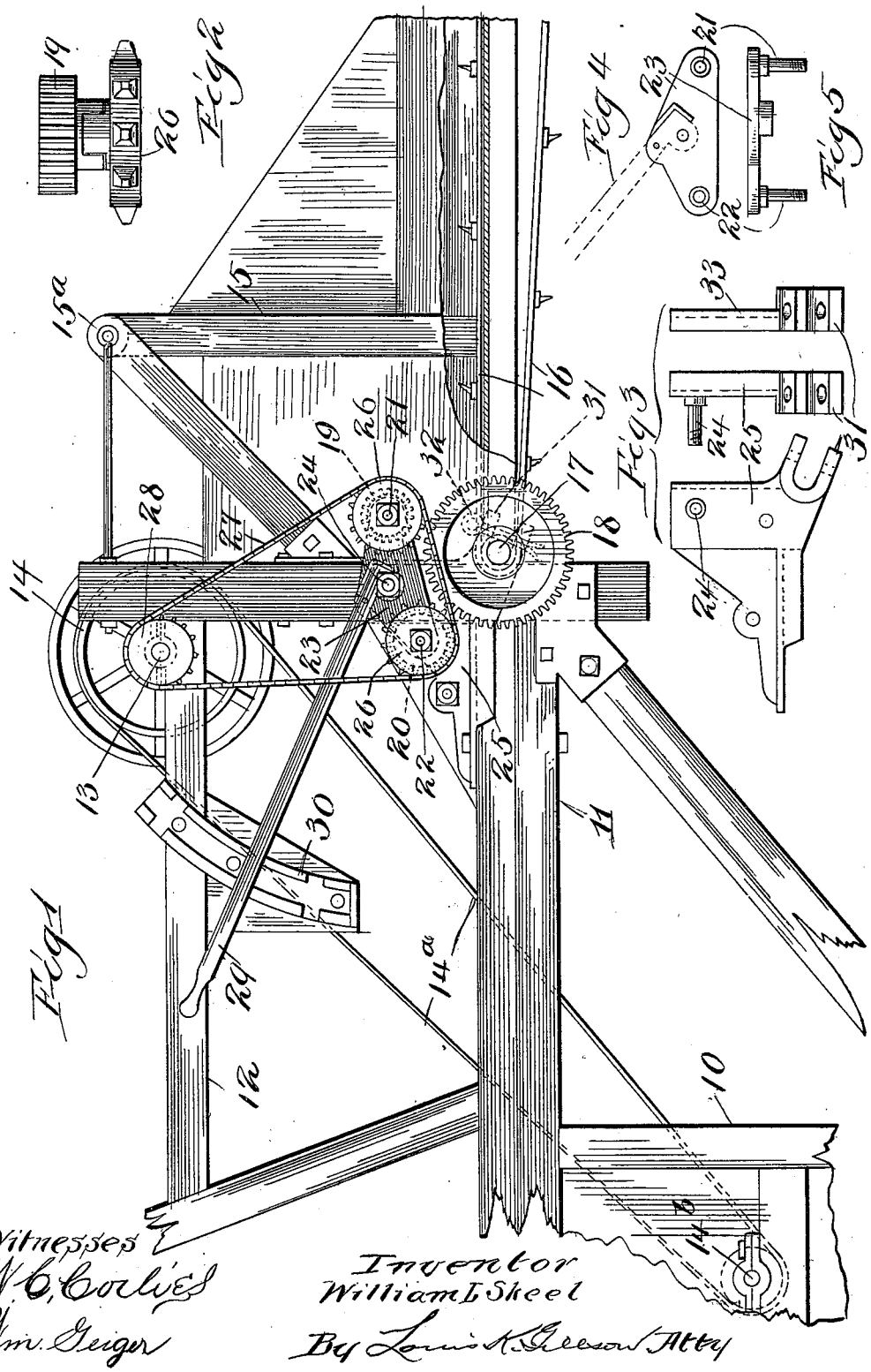
Witnesses
W. C. Corlies
Wm. Geiger
Inventor
William L. Skeel
By Louis K. Gleason Atty
THE NORRIS PETERS CO., PHOTO-LITHO., WASHINGTON, D. C.

UNITED STATES PATENT OFFICE.

WILLIAM L. SKEEL, OF SANDWICH, ILLINOIS.

AUTOMATIC FEEDER FOR THRESHING-MACHINES.

SPECIFICATION forming part of Letters Patent No. 675,302, dated May 28, 1901.

Application filed June 7, 1900. Serial No. 19,442. (No model.)

*To all whom it may concern:*

Be it known that I, WILLIAM L. SKEEL, a citizen of the United States, and a resident of Sandwich, county of Dekalb, and State of Illinois, have invented certain new and useful Improvements in Automatic Feeders for Threshing-Machines, of which the following is a specification, and which are illustrated in the accompanying drawings, forming a part thereof.

The invention relates to that class of feeders in which an endless spur-belt is employed for receiving and conveying the bundles of grain to the feed-table proper of the thresher; and the particular object of the invention is to provide means for varying the speed of the feeding mechanism or for throwing it entirely out of action.

The invention consists in the mechanism hereinafter described and which is illustrated in the accompanying drawings, in which—

Figure 1 is a detail side elevation of a threshing-machine. Fig. 2 is a detail plan of a pair of companion sprocket and toothed gears used in the device. Fig. 3 shows elevations of certain brackets used in the device. Fig. 4 is a detail elevation of a rocker-arm for carrying the gears, and Fig. 5 is a plan view of the same.

At 10 is shown a part of the main frame of the threshing-machine, a bracket 11 projecting therefrom to support the feed mechanism. A frame 12 is supported by the bracket 11, and upon it is journaled the power-shaft 13, by which the entire machine is actuated, this shaft carrying a belt-pulley 14 and driving a belt 14ª, which leads to the pulley of the cylinder-shaft 14ᵇ.

At 15 is shown the frame carrying the automatic feeder. It is usual to pivotally attach the frame of the feeder mechanism to the frame of the threshing-machine, so that it may be folded out of the way when the machine is being transported. In the present instance the frame 15 is shown as being pivotally attached to the frame of the machine at 15ª, so that it may be turned upwardly over the frame 12.

A portion of the endless feed-belt is shown at 16, and this belt turns over and is driven by a shaft 17, upon which there is mounted a gear-wheel 18. A pair of gears 19 and 20, differing in size, are mounted upon the stud-shafts 21 22, projecting from a rocker-arm 23, pivoted upon a stud 24, projecting from a bracket 25, fixed to the frame 12. A sprocket-wheel 26 is mounted with each of the gears 19 and 20. A sprocket-chain 27 turns over both of the sprocket-wheels 26 and also over a sprocket-wheel 28, mounted upon the shaft 13.

The rocker-arm 23 is manually controlled by means of a hand-lever 29, fixed thereto and sweeping over a notched quadrant-plate 30, secured to the frame 12. The rocker-arm 23 is so located with reference to the shaft 17 that it may be moved to bring either of the wheels 19 or 20 into mesh with the gear 18 or to disengage both of them therefrom, as shown in Fig. 1.

As shown in Fig. 2, the sprocket-wheels 26 and the gear-wheels 19 and 20 are provided with interlocking hubs, so that the gear will turn with the sprocket. By this arrangement the gears may be conveniently changed should it be desired to substitute for the one in use another of different size.

The bracket 25 is shown as being provided with a U-shaped journal-box 31, into which the shaft 17 enters when the feed mechanism is brought into position for action, as shown in Fig. 1. A cotter-pin 32 is set through the arms of this journal-box, so as to retain the shaft in place. A bracket 33, similar to the bracket 25, is mounted upon the farther side of the machine, but need not, of course, be provided with the stud 24.

In practice it is found that the feed to a threshing-machine must be controllable to be efficient. It not infrequently happens that the bundles differ in size, so that sometimes the feed will be more rapid than at other times and there is danger of clogging. This trouble may also arise from the varying condition of the straw, as it may be fed more or less rapidly to the machine, according to its condition. It is important, therefore, that the operator have full control of the feed mechanism and that he be able instantly to throw it entirely out of action or to vary its speed. This control, it will be seen, is fully provided for in the mechanism herein shown and described, as the hand-lever 29 is in position to be readily grasped by the operator, and by locating it in the middle notch of the plate 30, as shown in Fig. 1, the feed mechanism is entirely thrown out of action, while by locating it in either one of the other notches it is thrown into action and with the speed desired.

I have not attempted to show the details of the mounting of the feed-controlling mechanism in connection with any particular threshing-machine, and the construction will vary as the invention is applied to different makes of threshers.

I claim as my invention—

1. In power-transmission mechanism, in combination, a driven gear, an oscillating plate, a pair of pinions carried by the plate so as to alternately engage the driven gear, a sprocket-gear mounted concentrically with each pinion, a power-driven sprocket-wheel turning on a different center from that of the plate, and a chain turning over the three named sprockets, the two sets of gears carried by the oscillating plate being differentiated in size.

2. In a mechanical feeder for threshing-machines, in combination, an endless feed-belt, a driving-shaft therefor, a gear-wheel upon the driving-shaft, an oscillating plate, a pair of transmitting-gears journaled upon the plate and at opposite sides of its pivot, and adapted to alternately engage the driving-shaft gear to drive it at variant speeds, a sprocket-wheel mounted with each transmitting-gear, a driving-sprocket, and a chain running thereupon and upon the sprockets mounted with the transmitting-gears, the driven sprocket and the plate turning on different centers.

3. In a mechanical feeder for threshing-machines, in combination, an endless feed-belt, a driving-shaft therefor, a gear-wheel upon the driving-shaft, an oscillating plate, a pair of transmitting-gears of unequal size journaled upon the plate and at opposite sides of its pivot, and adapted to alternately engage the driving-shaft gear, a hand-lever for oscillating the plate, and means for securing the hand-lever in its extreme positions and in an intermediate position wherein both transmitting-gears are out of engagement with the driving-shaft gear.

WILLIAM L. SKEEL.

Witnesses:
O. M. SKEEL,
R. T. JOHNSTON.